US00RE34839E

United States Patent [19]

Tolson

[11] E Patent Number: Re. 34,839

[45] Reissued Date of Patent: Jan. 31, 1995

[54] WEIGHING AND LABELING APPARATUS AND METHOD

[75] Inventor: Sidney S. Tolson, Scotland Neck, N.C.

[73] Assignee: Ossid Corporation, Rocky Mount, N.C.

[21] Appl. No.: 31,825

[22] Filed: Mar. 8, 1993

Related U.S. Patent Documents

Reissue of:

[64] Patent No.: 5,086,855
Issued: Feb. 11, 1992
Appl. No.: 615,810
Filed: Nov. 13, 1990

[51] Int. Cl.[6] ..... G01G 23/38; G01G 19/00; B65G 15/14

[52] U.S. Cl. ..... 177/5; 177/145; 198/626.1

[58] Field of Search ..... 177/4, 5, 145; 198/626.1

[56] References Cited

U.S. PATENT DOCUMENTS

| | | | |
|---|---|---|---|
| 4,050,467 | 9/1977 | Van Sluis et al. | 198/626.1 |
| 4,415,048 | 11/1983 | Teraoka | 177/5 |
| 4,544,929 | 10/1985 | Lemelson | 346/9 |
| 4,941,379 | 7/1990 | Gasbarro | 198/631 X |
| 4,953,644 | 9/1990 | Akesson et al. | 177/145 |

OTHER PUBLICATIONS

Promotional flyer: New Brunswick International, Inc. "NBI HI-2600, High Speed Weigh/Labeler".

*Primary Examiner*—George H. Miller, Jr.
*Attorney, Agent, or Firm*—Olive & Olive

[57] ABSTRACT

An apparatus for the accurate weighing and labeling of products with non-flat bottoms including three sections each having a horizontal conveyor belt and a pair of vertical controls belts to eliminate product wobble and improve weight are of a relatively thick, resilient material and are adjustable in spacing to accommodate various size products.

12 Claims, 4 Drawing Sheets

WEIGHING AND LABELING APPARATUS AND METHOD

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to an apparatus and method for weighing and labeling items, and more particularly for weighing and labeling items which rest on nonflat bottoms, such as whole poultry in bags while such items are transported by conveyor in a high speed weighing and labeling operation.

2. Background of the Art

In high speed packaging, weighing and labeling operations, after the step of wrapping a product such as meat or poultry for sale in a supermarket, the next requirement is for that product to be weighed and labeled. If the product happens to be one with a flat bottom or one supported in a tray, it tends to function smoothly in a conveyorized operation. If it is a product that does not have a flat bottom, such as a whole bird poultry product or is another type of product having an irregular surface on which the product typically rests while being conveyed, the swift movement of a conventional flat horizontal conveyor may induce oscillation or wobble in the product while being conveyed. The reason for this is that in modern conveyorized packaging operations, the products can be processed at speeds of 70 or more pieces per minute. That amount of speed will frequently jolt a whole bird poultry product such that it rocks on its nonflat bottom and begins to wobble.

Wobble or oscillation by itself may not present a problem if it is being transported merely to get to a destination, but when the purpose of the transport is to weigh and label the bird, unreliability and inaccuracy will most likely occur. A wobble in the weighing operation will result in an incorrect weight. A wobble in the labeling operation will result in an improperly positioned label. In addition, the wobble on a flat open conveyor belt frequently results in an orientational misalignment of the product, further disturbing label location.

The conventional conveyor is one which has a basically flat horizontal belt, or similar supporting surface, and transports the product through the operative stations. In the case of a multiple process sequence, typically entry, weighing, and labeling, the conveyor system may be a series of short conveyors working in sequence. Such a multiple sequence conveyor apparatus for weighing and labeling is exemplified by the HI 2600 made by New Brunswick International, Inc. of Lilburn, Ga. Wobble is very likely to occur in this sort of system when the product does not have a flat bottom.

While the referred to type of multiple process conveyor equipment is more reliable for weighing a product which is in a tray, since it will not wobble, there is an additional drawback. Since the entire movement of the product relies on friction with the conveyor surface, the consistency of that frictional contact controls the consistency of positioning of the label. If there is grease on the surface of either the conveyor or the product or a difference in the weight of the product, thereby affecting the frictional drive, there could be a variation in the position of the product at the time the label is applied due to slippage. At the operating speeds common today at 70 or more pieces per minute, a signal is often generated prior to the time the product reaches the labeling station so that the label will be propelled to intercept the product at the right time. Unless the product moves forward at a known speed, the label may be applied differently from item to item. Naturally, the more uniform the label placement, the more acceptable the product. This situation is exacerbated by a design feature of many current conveyor weighing devices which, in order to separate items so only one is at the weighing station at a time, will run the three sections at successively increased speeds.

As used in the following description and claims, a "nonflat" bottom refers to a bottom surface of a product on which the product rests and which supports the product in a manner which is somewhat unstable and may tend to permit the product to wobble on a conveyor.

Therefore, an object of the present invention is to improve the accuracy and reliability of weighing of conveyor weighed products with nonflat bottoms.

A further object of the present invention is to improve the label placement accuracy of all shaped products labeled in a conveyorized operation.

An additional object of the present invention is to maintain better control of the products being weighed and labeled at current process speeds and further increased speeds likely to occur in the near future.

Other objects will become apparent as the description proceeds.

SUMMARY OF THE INVENTION

An apparatus is provided for the weighing and labeling of products with nonflat bottoms in a conveyorized, automated high-speed process in which there is a separate conveyor section for each function, each section having a pair of adjustable spaced vertical control belts mounted perpendicular to the horizontal conveyor belt on which the product rests and commonly driven therewith. The perpendicularly mounted pair of control belts have resilient surfaces and are positioned and adjusted to grip the nonflat bottom product to prevent oscillating and mispositioning due to high-speed handling to avoid inaccurate weighing and poor label placement.

DESCRIPTION OF THE INVENTIÓN

Figure 1:
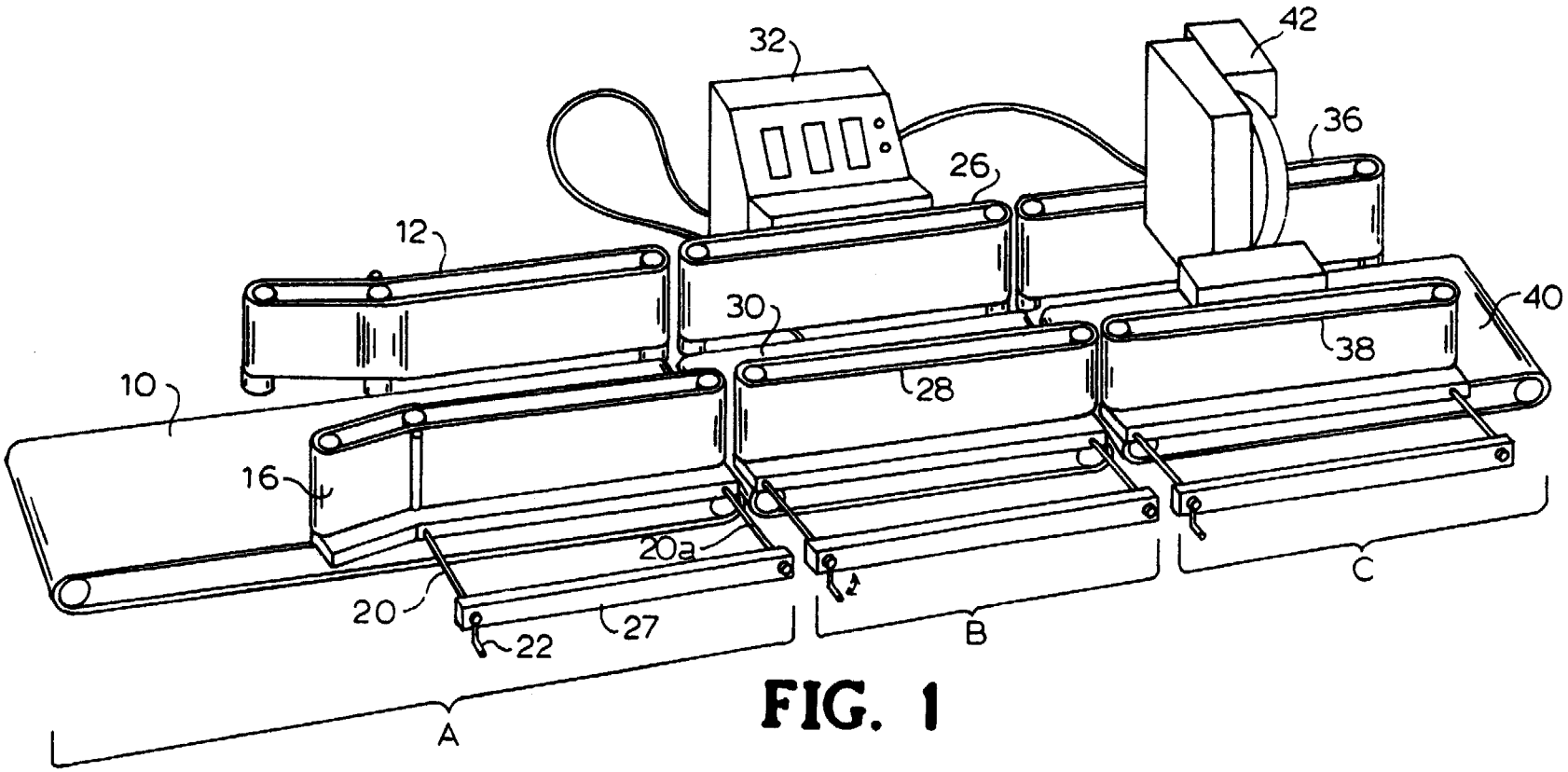
FIG. 1 is a perspective view of the weighing and labeling apparatus according to the present invention illustrating the multiple process sequence of entry, weighing and labeling.

In an apparatus for the weighing and labeling of products having nonflat bottoms, such as a bag enclosed whole bird poultry product, an automatic high-speed process as shown in FIG. 1 has three operative stations designated A, B and C. Station A is the entry section for transporting the product to the following sections for processing, Station B is the weighing operational section, and Station C is the operational station for printing and applying a label to the product.

Station A of FIG. 1 has a substantially horizontal, flat, mechanically driven conveyor belt 10 extending from the entry end of the apparatus and continuing to transport the products to Station B. Mounted in a plane perpendicular to conveyor belt 10 in fixed relation thereto is rear control belt 12, driven in the same direction and at the same speed as conveyor belt 10. Mounted parallel to rear control belt 12 is front control belt 16, which is adjustable in its proximity to rear control belt 12 through a mechanism depicted in FIG. 4 to accommodate various sizes of poultry. The entry ends of both control belts 12 and 16 form an outwardly directed angle in relation to the main planes of belts 12 and 16 to allow the product P to be guided automatically into the main conveyor path. Any suitable drive mechanism may be employed to drive the belts 10, 12 and 16 and such mechanism is not shown to better illustrate the invention.

Upon leaving Station A, the product P is aligned with the main path of the conveyor 10. In order to insure the positioning of only one product P at a time on weighing Station B, a commonly used system operates the conveyor belt of weighing Station B at a speed greater than that of entry Station A to drive a first product P through Station B before a second product P has emerged from Station A. Similarly, the belt of the labeling Station C is run at a speed greater than that of weighing Station B. By this device, a spacing between successive items on the multiple segment conveyor, and particularly on the weighing Station B, is assured.

It is possible to operate Station B at the same speed as Station A, or to design the machine with Station A and Station B combined into one section. This method would result in a loss in processing speed, because the first product would have to exit the weighing section before the second product is permitted to enter the weighing station.

Station B has a substantially horizontal, flat conveyor belt 30 and rear control belt 26 mounted perpendicular in fixed relation thereto. Front control belt 28 is mounted adjustable spaced from and parallel to rear control belt 26. Adjustment between control belts 26 and 28 is accomplished in a similar manner to the adjustment between control belts 12 and 16 in Station A. Conveyor belt 30 and control belts 26 and 28 all operate at the same speed, that being somewhat faster than the speed of the belts in Station A so that the product P is physically separated on Station B for unitary weighting. A conventional drive mechanism such as employed to drive belt 30 may be readily adapted to drive belts 26, 28 and is not shown for purpose of better illustrating the invention. Station B functions to measure the weight of the product P and then send information relative to this weight to Station C for label imprinting. Weighing control device 32 of Station B as is known in the art, is electrically connected to Station B and to the label printing and applying apparatus 42 of Station C.

Station C has substantially horizontal, flat conveyor belt 40 and rear control belt 36 mounted perpendicular thereto in fixed relation. Front control belt 38 is mounted adjustably spaced from and parallel to rear control belt 36 and is adjustable in a similar manner to the mechanisms of Stations A and B. The three operative belts of Station C run at equivalent speeds and direction to each other and at a speed somewhat faster than that of the belts of Station B. A conventional drive mechanism, not shown, may be readily adapted. The speed differential is again achieved in order to assure that only a single product P at a time is present on the weighing station. Station C has a label imprinting apparatus 42 which receives the weight information from the weighing device in Station B, imprints a label and applies the imprinted label to the product P. There may be a product sensing switch or photoelectric cell, not shown, placed along Station B to cue the label printer in Station C for readiness. Such a product sensing switch will detect the product P as it passes a point in the system and signal to another point in the system that according to the speed of the transport means in the system the product P will arrive at the second point at a given time relative to the time it has passed the first point.

Figure 2:
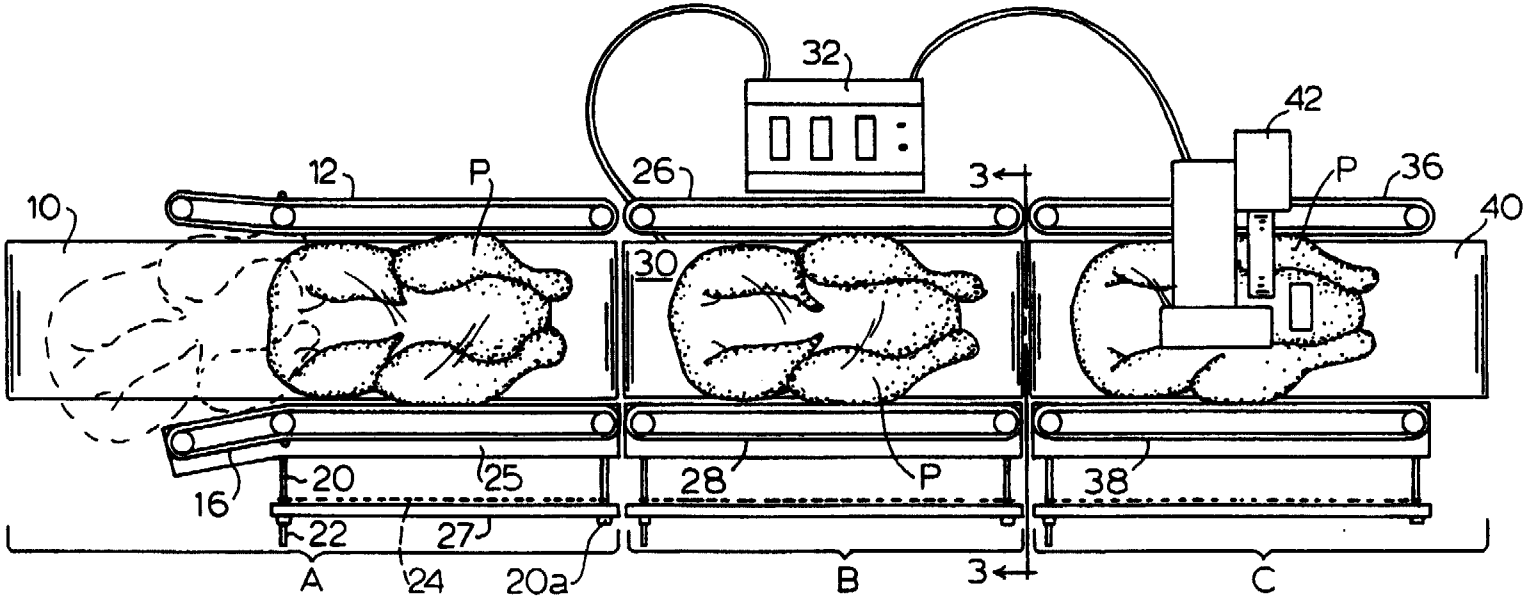
FIG. 2 is a plan view of the apparatus of FIG. 1 further depicting a bagged whole bird poultry product being processed at each operating section.

With the foregoing description of the apparatus as background, the following describes how the apparatus acts on the product P being processed. FIG. 2 shows the weighing/labeling apparatus of the invention with the addition of the product P being processed. The poultry product P is seen in Station A being aligned and moved toward Station B; in Station B being weighed and move toward Station C; and in Station C being labeled and moved out of the apparatus. For Station B weighing to be reliable, the poultry or other nonflat bottom product must be controlled to avoid oscillation as is accomplished by the invention. For Station C label application to be properly positioned, the product must be maintained in a precise placement, which is accomplished by the present invention. A standard flat conveyor will not satisfy either of these needs.

Figure 3:
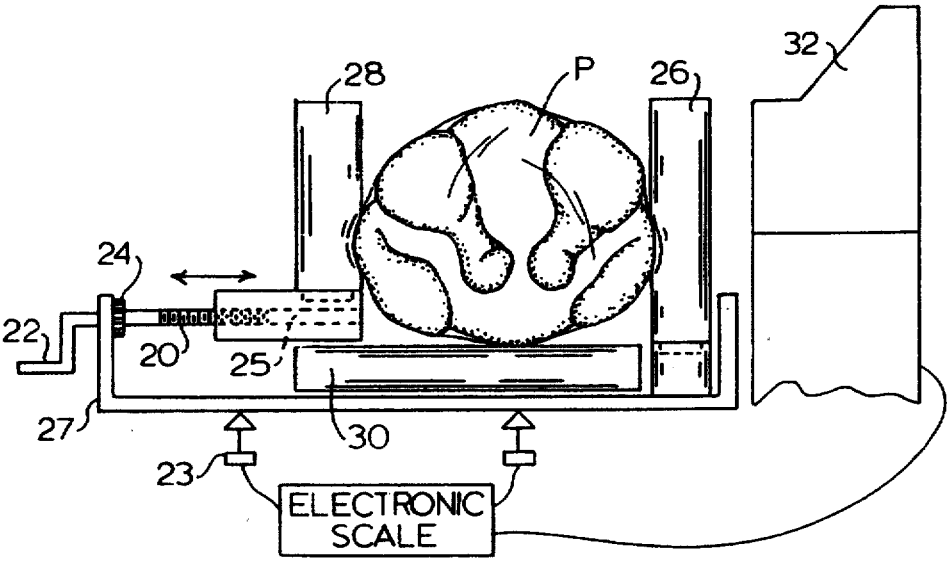
FIG. 3 illustrates the irregular outline of a typical whole bird poultry product as seen from the foot end being moved through a conveyor of the invention as viewed along line 3—3 of FIG. 2 with further detail of the space adjusting mechanism.

The large difference in size between one type of product and another (e.g. chickens and turkeys) will be accommodated by the adjusting means of changing the space between the rear fixed control belt 12, 26, or 36 and the respective front adjustable control belt 16, 28, or 38. This will not however, be sufficiently flexible to adequately grip all birds with the minor size variations as will occur within a class, such as that of a four pound and a five and one-half pound chicken. One embodiment to enable proper gripping of the poultry product, as shown in FIGS. 1, 2 and 3 is directed to control belt 12 and control belt 16 being made of a resilient, relatively thick material so as to achieve controlled gripping of the poultry or other irregular product. The vertical control belts of Stations B and C are constructed similarly.

An end view of the apparatus illustrates the effective gripping of the irregular product as shown in FIG. 3. In FIG. 3, the basic irregularity of the poultry product P is illustrated to emphasize the value of the resilient surfaces of control belts 26 and 28. As the product P passes between control belts 26 and 28, the resilient, relatively thick belt materials compress to grip and transport the product P without slippage or wobbling. The view of FIG. 3 is typical of any of the three sections of the invention with regard to both the handling of an irregularly shaped product and the mechanism for adjusting the spacing of the control belts.

FIG. 3 also shows a detailed view of a spacing adjustment and weight detecting system which may be utilized to vary the basic spacing between front and rear control belts 26 and 28. Crank 22 is rotated manually, which turns lead screw 20, connected to a lower corner of the control belt 26 assembly. Sprocket mounted timing chain 24 connects screw 20 to operate synchronously an identical screw 20a (FIG. 2) connected to the opposite lower corner of front control belt 26 thereby adjusting the spacing between control belts 26 and 28 while maintaining parallelism therebetween. The screws 20 are assembled to engage threaded blocks 25 which support control belt 28. The entire assembly of conveyor belt 30, control belts 26 and 28, lead screws 20, crank 22, platform 27, and all support and drive mechanism is depicted according to the invention as being supported upon one or more electronic scale load cells 23 or similarly functioning component. Load cells 23 are electrically connected and transmit data to a signal processor comprising a microprocessor or computer 32 and then to label imprinter 40 at Station C of FIGS. 1 and 2. The weight signal generated by load cells 23 are fed to the signal processor 32 which by conventional means deducts the equipment weight and produces a net product weight which si fed to the labeling apparatus 42.

Figure 4:
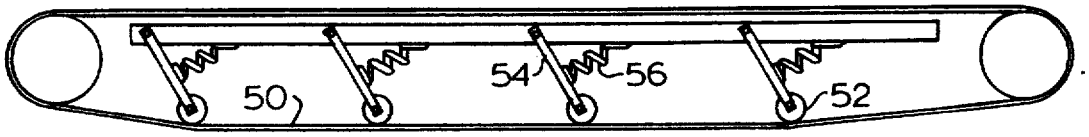
FIG. 4 is a plan view which portrays one arrangement for spring biased rollers for maintaining a firm gripping contact of the control belts on the product.

An alternate means of maintaining grip on the sides of products of non-uniform weight and irregular shape is illustrated in FIG. 4 as a series of rotatably mounted rollers 52 within the loop of thin control belt 50 and springs 56 biased on pivoted arms 54, the arms and springs being arranged so as to force rollers 52 against the inner surface of belt 50. When a product passes the control belt 50, it successively compresses the rollers 52 which press inwardly against springs 56 resistance, firmly holding the poultry product.

The present invention is related to the commonly utilized system having multiple conveyor belts operating at successively increasing speeds to isolate the product being weighed in the weighing station. It is to be understood that other conveyorized systems which may have only a single conveyor belt would benefit equally from the principle contained herein of eliminating wobble for more accurate weight and label placement.

While the principal objective of the present invention is the control of oscillation or wobble in whole poultry in order to obtain accurate weighing and desired label positioning, an additional objective thereof, as stated above, is in the handling of packaged meat and poultry products in trays. These tray packed products are processed in the same sort of automated equipment wherein weighing and labeling operations occur at similarly fast speeds. When the product is in a tray there is little possibility of wobble, but there is the possibility of imprecise placement of labelling.

The tray is transported in the prior art conveyorized machinery, on a flat driven belt. Control of the movement and position of the product depends on friction between the bottom of the tray and the belt. If there should be some grease or water on the belt, or if there is significant difference in the weight of the product, slippage could occur. This is particularly true because it is desirable and usual to operate the belt of Station C faster than that of Station B, which is running faster than the belt of Station A, as previously discussed. As can be readily appreciated, the change in speed of the belts will frequently instigate slippage.

When slippage occurs in the transport of the product, particularly between the point of product sensing and the point of label application, the label is not likely to be applied in a uniform, controlled position from item to item. The present invention provides a means for gripping the sides of the tray containing the product between relatively thick, resilient control belts and positioning the tray for label application more precisely.

Figure 5:
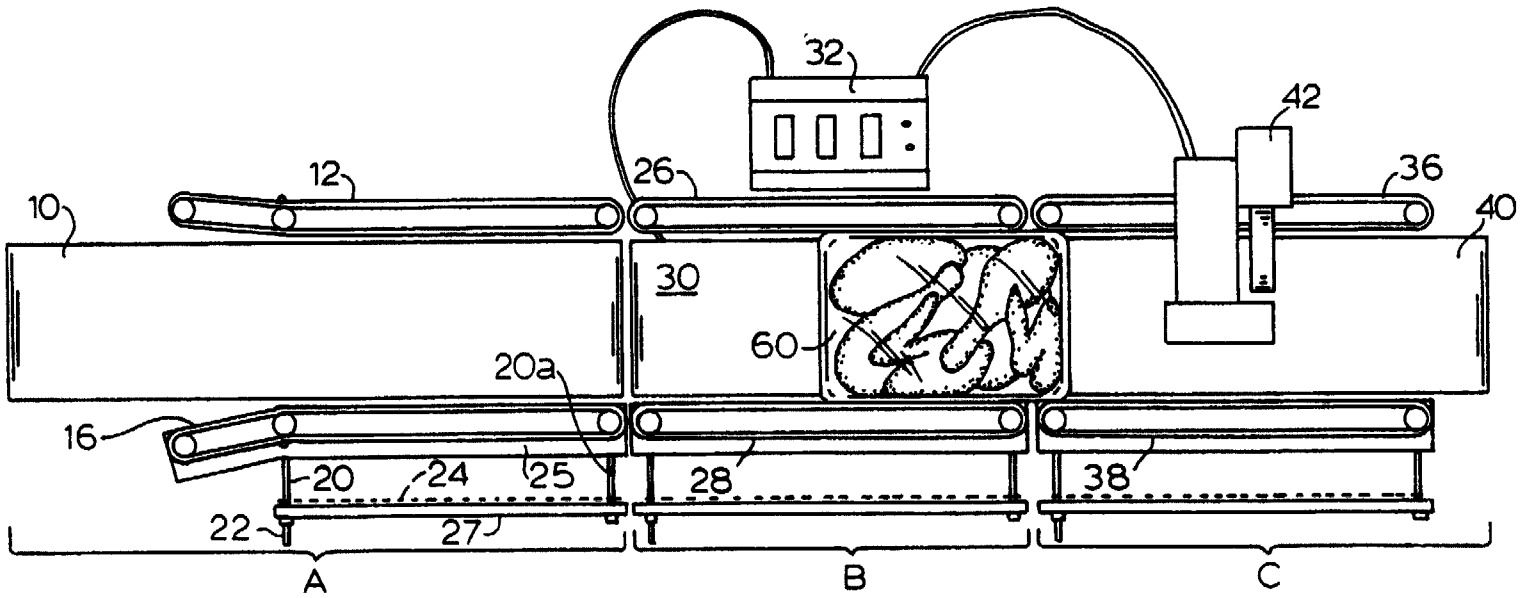
FIG. 5 is a plan view which illustrates the invention as applied to the transporting, weighing and labeling of a product in a tray.

Therefore, in FIG. 5, a tray 60 of wrapped product is transported along the conveyor system from a relatively low entry speed in Station A to an intermediate speed in Station B to a maximum speed in station C. As the tray 60 leaves Station B, it is still being held between control belts 26 and 28. The forward portion of the tray comes in contact with control belts 36 and 38 at Station C and the bottom of the tray is shown transferring from flat conveyor belt 30 of Station B to flat conveyor belt 40 of Station C. By the application of inwardly directed pressure of the thick, resilient belt material of the control belts, the reliance on the product's weight-generated friction on the horizontal belt surface becomes insignificant. Even if there were some grease or water on the belts, the more positive mechanical pressure and the resilient surfaces of the vertical control belts increase the positioning reliability to achieve the desired label placement consistency. A means of aiding reliable handling between Station B and C is to adjust the control belts 36 and 38 of Station C in closer proximity than are belts 26 and 28 of Station B, thereby achieving controlled gripping in passing from Station B to Station C.

The above described advantage of controlling grip on a product in a tray, or other relatively uniform container will be achieved as well in handling of a product with an irregular contour to improve the repeatability of positioning of a label on successive products.

As will be appreciated by those skilled in the art, the specific details described in the illustrated embodiment of the present invention may vary from that shown. Other means to accomplish the objective of controlling product oscillation through the device of control belts may be apparent and which are considered within the scope and principles taught herein.

What is claimed is:

1. An apparatus for the weighing and labeling of products with non-flat bottoms in a high speed processing environment, comprising:

(a) first conveyor means including a first horizontal conveyor to support and transport said products into operating position and including a first pair of vertical control belts mounted primarily in a pair of parallel planes perpendicular to said first horizontal conveyor and operative in a direction parallel to the direction of said first horizontal conveyor at a synchronous speed therewith, said first pair of vertical control belts being separated by a space such that said products are gripped securely therebetween;

(b) second conveyor means aligned with and mounted adjacent said first conveyor means, including a second horizontal conveyor to support and transport said products during a weighing operation and including a second pair of vertical control belts mounted in a pair of parallel planes perpendicular to said second horizontal conveyor and operative in a direction parallel to the direction of said second horizontal conveyor at a synchronous speed therewith, said second pair of vertical control belts being separated by a space such that said products are gripped securely therebetween;

(c) said second conveyor means being mounted on a weighing device capable of registering the weight thereof including the weight of any product carried thereby to produce individual product weight information and transmitting said product weight information as a signal to a signal processing device;

(d) third conveyor means mounted adjacent said second conveyor means including a third horizontal conveyor aligned with and mounted adjacent said second conveyor means to support and transport said products during a labeling operation and including a third pair of vertical control belts mounted in a pair of parallel planes perpendicular to said third horizontal conveyor and operative in a direction parallel to the direction of said third horizontal conveyor at a synchronous speed therewith, said third vertical control belts being separated by a space such that said products are gripped securely therebetween; and (e) labeling means mounted adjacent said third conveyor means and connected to said signal processing device, said labeling means being capable in response to said signal of imprinting and transferring a label onto each of said products in sequence prior to each of said products being expelled from the said weighing/labeling apparatus and while each said product is in continuous motion on said third horizontal conveyor.

2. An apparatus as claimed in claim 1 in which said control belts in each of said three conveyor means are constructed as a resilient conveyor means and thereby accommodate minor variations in product size and shape.

3. An apparatus as claimed in claim 2 in which said first pair of vertical control belts extend between entry and exit ends and are configured with a greater separation at the entry end than at the exit end so as to align each successive one of said products to the path of said three conveyor means.

4. An apparatus as claimed in claim 3 in which said vertical control belts in each of said three conveyor means are adapted to be adjustable in spacing from one another while maintaining substantial parallelism.

5. A method for weighing and labeling of a product having a non-flat bottom in a high-speed processing environment, comprising:

(a) continuously transporting said product by means of a series of aligned first, second and third horizontal conveyors each extending between an entry end and an exit end and being adapted for conveying the product supported on its nonflat bottom;

(b) gripping said product successively between a series of first, second and third pairs of vertical, resilient control belts, each of said pair of control belts being mounted perpendicular to and driven synchronously with a respective one of said horizontal conveyors to minimize product oscillation and misalignment;

(c) electro-mechanically weighing said product while being conveyed on the second of said three horizontal conveyors to derive a net weight of the product by eliminating the tare weight of the second conveyor from the total weight registered;

(d) transmitting a signal representative of the derived net weight of said product to labeling apparatus located adjacent said third conveyor;

(e) while moving on said third conveyor, printing and applying a label having information representative of the weight and other identification of said product; and (f) expelling said product from said third conveyor.

6. A method as claimed in claim 5 in which said first pair of vertical control belts are located adjacent said first conveyor and are configured with a greater separation at the entry end than at the exit end thereof and including the step of aligning said product utilizing said first pair of vertical control belts.

7. A method as claimed in claim 6 in which each of said pairs of vertical control belts are adapted to be adjustable in spacing from one another while maintaining substantial parallelism and including the step of adjusting such spacing to accommodate products of different width.

8. An apparatus for the weighing and labeling of a product with a non-flat bottom in a high-speed processing environment, comprising;

(a) conveyor having a first, a second, and a third segment, each said segment having an entry end and an exit end and including a mechanically driven horizontal conveyor belt and a pair of parallel control belts mounted perpendicular to said conveyor belt and operating in a direction parallel and at a synchronous speed thereto;

(b) said first segment being configured with a greater space between said control belts at the entry end than at the exit end thereof for aligning said product prior to transporting said product to said second segment;

(c) said second segment being mounted upon a weighing device adapted for weighing said product and sending a signal representative of such weight to a signal processor and being operative for transporting said product to said third segment; and (d) said third segment having a labeling device capable of receiving said signal from a said signal processor and imprinting and appling a label to said product and being operative for expelling said product from said apparatus.

9. An apparatus as claimed in claim 8 including means for mounting said control belts in a manner enabling said control belts to be adjustable in spacing from each other to accommodate various size products.

10. An apparatus as claimed in claim 9 in which said second segment operates at a speed greater than said first segment and in which said third segment operates at a speed greater than said second segment.

*11. An apparatus for the weighing and labeling of a product, being one of a sequence, with a non-flat bottom in a high-speed processing environment, comprising:*

*(a) first conveyor means having an entry end and an exit end and means operative to align and stabilize a product with a non-flat bottom in a position suitable for being weighed while moving on a second conveyor means at a weighing station;*

*(b) second conveyor means having an entry end at which said aligned and stabilized product with a non-flat bottom is received from said exit end of said first conveyor means, said second conveyor means being operative to maintain said product with a non-flat bottom aligned and stabilized while on said second conveyor means and to discharge said product at an*

*exit end of said second conveyor means in a position suited to the labeling of said product;*

*(c) said second conveyor means being mounted on a weighing device capable of registering the weight of any product carried thereby to produce individual product weight information and transmitting said product weight information as a signal to a signal processing device;*

*(d) third conveyor means having an entry end at which the aligned, stabilized and weighed product is received from the exit end of the second conveyor means, said third conveyor means including a horizontal conveyor aligned with said second conveyor means to support and transport said products during a labeling operation and including a pair of vertical control belts mounted in a pair of parallel planes perpendicular to said horizontal conveyor and operative in a direction parallel to the direction of said horizontal conveyor at a synchronous speed therewith, said vertical control belts being separated by a space such that said product with a non-flat bottom is gripped securely therebetween; and*

*(e) labeling means mounted adjacent said third conveyor means and connected to said signal processing device, said labeling means being capable in response to said signal of imprinting and transferring a label onto each product in sequence prior to each said product being expelled from the said weighing/labeling apparatus and while each said product is stabilized and is in continuous motion on said third horizontal conveyor.*

*12. An apparatus for the weighing and labeling of a product, being one of a sequence, with a non-flat bottom in a high-speed processing environment, comprising:*

*(a) first conveyor means having an entry end, an exit end and a first pair of vertical control belt separated by a space such that a product being conveyed is gripped securely therebetween and being operative to align and stabilize a product with a non-flat bottom in a position suitable for being weighed while moving on a second conveyor means at a weighing station;*

*(b) second conveyor means having an entry end at which said aligned and stabilized product with a non-flat bottom is received from said exit end of said first conveyor means, said second conveyor means being operative to maintain said product with a non-flat bottom aligned and stabilized while on said second conveyor means and to discharge said product at an exit end of said second conveyor means in a position suited to the labeling of said product;*

*(c) said second conveyor means being mounted on a weighing device capable of registering the weight of any product carried thereby to produce individual product weight information and transmitting said product weight information as a signal to a signal processing device;*

*(d) third conveyor means having an entry end at which the aligned, stabilized and weighed product is received from the exit end of the second conveyor means, said third conveyor means including a horizontal conveyor aligned with said second conveyor means to support and transport said products during a labeling operation and including a second pair of vertical control belts mounted in a pair of parallel planes perpendicular to said horizontal conveyor and operative in a direction parallel to the direction of said horizontal conveyor at a synchronous speed therewith, said vertical control belts being separated by a space such that said product with a non-flat bottom is gripped securely therebetween; and*

*(e) labeling means mounted adjacent said third conveyor means and connected to said signal processing device, said labeling means being capable in response to said signal of imprinting and transferring a label onto each product in sequence prior to each said product being expelled from the said weighing/labeling apparatus and while each said product is stabilized and is in continuous motion on said third horizontal conveyor.*

* * * * *

UNITED STATES PATENT AND TRADEMARK OFFICE

CERTIFICATE OF CORRECTION

PATENT NO. : RE 34,839
DATED : January 31, 1995
INVENTOR(S) : Sidney S. Tolson

It is certified that error appears in the above-indentified patent and that said Letters Patent is hereby corrected as shown below:

Column 9, line 37, correct "belt" to read --belts--. (PTO error)

Signed and Sealed this

Fourth Day of April, 1995

Bruce Lehman

*Attest:*

BRUCE LEHMAN

*Attesting Officer*

*Commissioner of Patents and Trademarks*